(12) United States Patent
Bentley

(10) Patent No.: US 8,279,242 B2
(45) Date of Patent: Oct. 2, 2012

(54) COMPENSATING FOR ANTICIPATED MOVEMENT OF A DEVICE

(75) Inventor: Devlin David Bentley, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 12/239,277

(22) Filed: Sep. 26, 2008

(65) Prior Publication Data

US 2010/0079485 A1 Apr. 1, 2010

(51) Int. Cl.
*G09G 5/00* (2006.01)
(52) U.S. Cl. ......... 345/672; 345/156; 345/173; 345/619
(58) Field of Classification Search .................. 345/672, 345/156
See application file for complete search history.

(56) References Cited

U.S. PATENT DOCUMENTS

| | | |
|---|---|---|
| 7,305,475 B2 | 12/2007 | Tock |
| 7,401,147 B2 | 7/2008 | Sikora et al. |
| 2006/0013235 A1 | 1/2006 | Farnham |
| 2006/0017692 A1 | 1/2006 | Wehrenberg et al. |
| 2006/0248197 A1 | 11/2006 | Evans et al. |
| 2007/0074217 A1 | 3/2007 | Rakvic et al. |
| 2007/0283264 A1 | 12/2007 | Vau et al. |
| 2008/0030360 A1 | 2/2008 | Griffin |
| 2008/0120409 A1 | 5/2008 | Sun et al. |
| 2008/0126751 A1 | 5/2008 | Mizrachi et al. |
| 2008/0218475 A1 | 9/2008 | Appleyard et al. |
| 2009/0201246 A1* | 8/2009 | Lee et al. ...................... 345/156 |

FOREIGN PATENT DOCUMENTS

WO 2007007330 A2 1/2007

OTHER PUBLICATIONS

Han et al., Development of real-time motion artifact reduction algorithm for a wearabel photoplyethysmography, Aug. 23-26, 2007, IEEE pp. 1-4.*
Cha, Bonnie, "Palm Announces Low-Cost Treo 680", Dated: Oct. 12, 2006, http://reviews.cnet.com/4532-10921_7-0.html?author=5116399.
"Symbian S60 Manual", RoadSync Using Exchange ActiveSync, DataViz, Inc, Retrieved on Jul. 29, 2008, pp. 1-33.
"Battle of the Pushers: The Search for the Ideal Push Email Solution", Published by Rafe Blandford, Date: Sep. 10, 2007, 13 Pages.
International Search Report and Written Opinion of International Application No. PCT/US2009/057921, dated Apr. 30, 2010, 11 pages.

* cited by examiner

*Primary Examiner* — M Good Johnson

(57) ABSTRACT

Anticipating movement of a display device and compensating for the anticipated movement. As a user performs an activity while viewing the device, the device experiences movement. The movement is compared to pattern data associated with profiles. One of the profiles is selected based on the comparison. Based at least on compensation data associated with the profile, image data for display on the device is modified to compensate for the anticipated movement. In some embodiments, the image data is shifted horizontally and/or vertically relative to a display area of the device in the opposite direction of the anticipated movement.

20 Claims, 7 Drawing Sheets

COMPENSATING FOR ANTICIPATED MOVEMENT OF A DEVICE

BACKGROUND

Mobile computing devices, such as mobile telephones and portable audio/video devices, have become increasingly popular in recent years. As the devices continue to get smaller and more portable, users have begun to operate the devices while performing various activities such as walking, jogging, running, and driving. For example, the users walk around while checking electronic mail messages. Unfortunately, the smaller form factor of the devices typically results in a smaller screen size on the device. Consequently, the effects of device movement or jitter during the activities are more pronounced, inducing eyestrain and negatively affecting operation and the user experience.

SUMMARY

Embodiments of the invention improve user interaction with a display device by anticipating movement of the device and compensating for the anticipated movement. Profiles describe patterns of movement of the device over time. Movement data generated from movement of the device is compared to the patterns. One of the profiles is selected based on the comparison. The selected profile includes compensation data for adjusting image data relative to a display area of the device in anticipation of the movement. The adjusted image data is provided to the device for display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
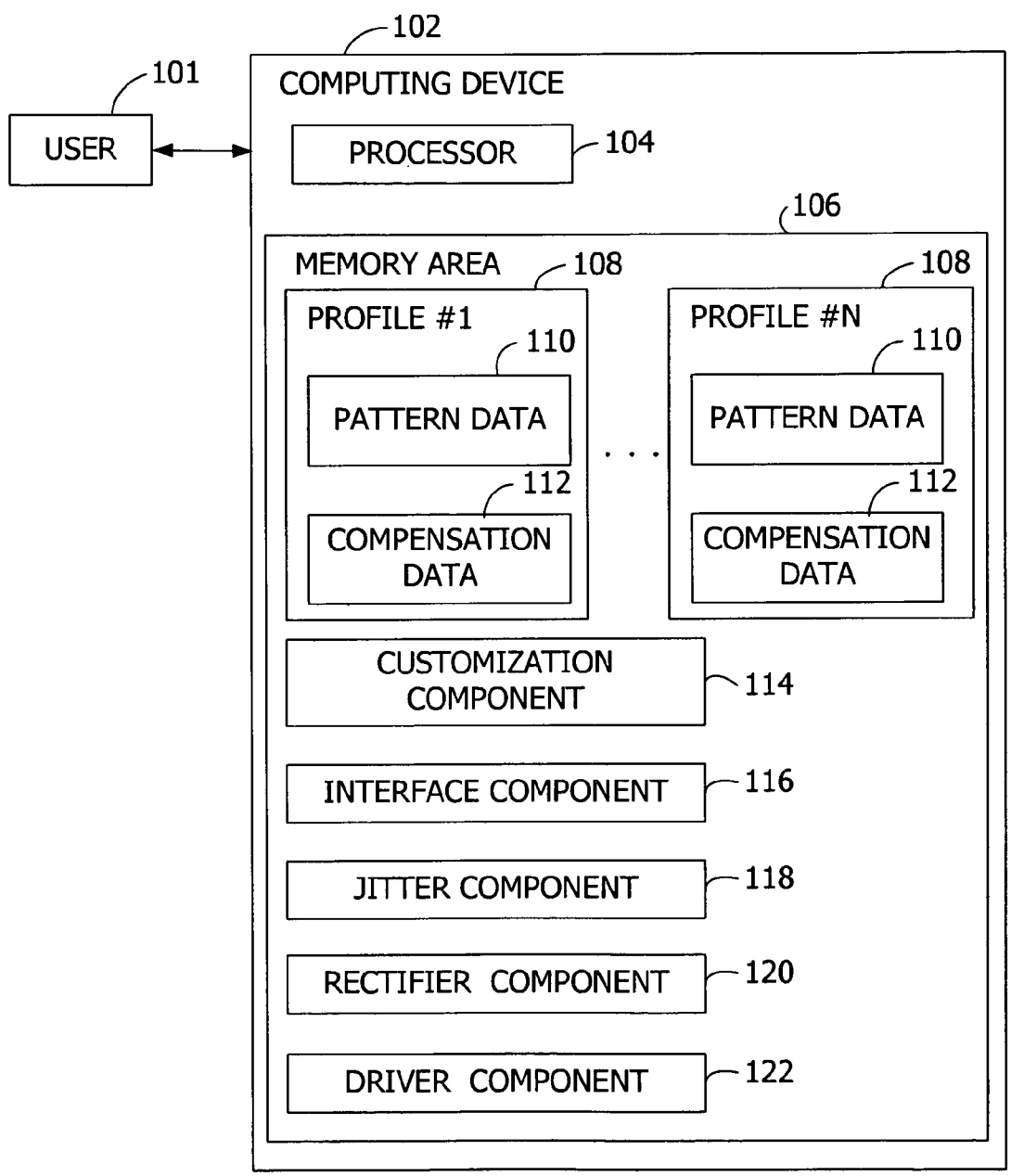
FIG. 1 is an exemplary block diagram illustrating a user interacting with a computing device.

Referring to the figures, embodiments of the invention automatically detect movement of a display device 204 and stabilize an image displayed on the display device 204. Aspects of the invention operate to anticipate the movement and dynamically compensate for the movement to maintain a fixed line of sight between the device and a user 101. For example, the image is shifted by a quantity of pixels rows or columns in a direction opposite from the anticipated movement. The compensation effectively stabilizes the image on the display device 204 relative to the movement to provide an improved user experience despite the movement.

While aspects of the invention are described with reference to the display device 204 being a mobile computing device 302 or other computing device 102, embodiments of the invention are operable with any device with a display area 206 subjected to movement or jitter. For example, aspects of the invention are operable with devices such as laptop computers, gaming consoles, and hand-held or vehicle-mounted navigation devices. Further, while some aspects of the invention are described with reference to one or more digital accelerometers 208 providing data on the movement of the display device 204, embodiments of the invention are operable with other means for determining movement data for the display device 204. Yet further, while aspects of the invention are described with reference to implementation in software, embodiments of the invention are operable with implementations in any form including hardware, software, firmware, or any combination thereof.

Referring again to FIG. 1, an exemplary block diagram illustrates the user 101 interacting with the computing device 102. The computing device 102 includes a processor 104 and a memory area 106, or other computer-readable media. The memory area 106 stores one or more computer-executable components such as a customization component 114, an interface component 116, a jitter component 116, a rectifier component 120, and a driver component 122. Operation of these components is described with reference to FIG. 4 below.

The memory area 106 further stores one or more profiles 108 such as profile #1 through profile #N, where N is a positive integer. The profiles 108 describe possible movement of the computing device 102 over time. The profiles 108 may be associated with, for example, different activities to be performed by the user 101 such as walking, running, or jogging. Each of the profiles 108 includes pattern data 110 and compensation data 112. The compensation data 112 describes a relationship between image data 202 and the display area 206 of the computing device 102 during movement of the computing device 102. The compensation data 112 is applied to the image data 202 in anticipation of movement (e.g., display jitter) of the computing device 102 to offset or compensate for the anticipated movement. The pattern data 110 includes, for example, a sequence of anticipated movements of the computing device 102 including the direction and magnitude of each movement. The compensation data 112 includes, for example, a sequence of adjustments to the image data 202 (e.g., pixel row and/or column adjustments) to counteract the sequence of anticipated movements in the pattern data 110.

Figure 2:
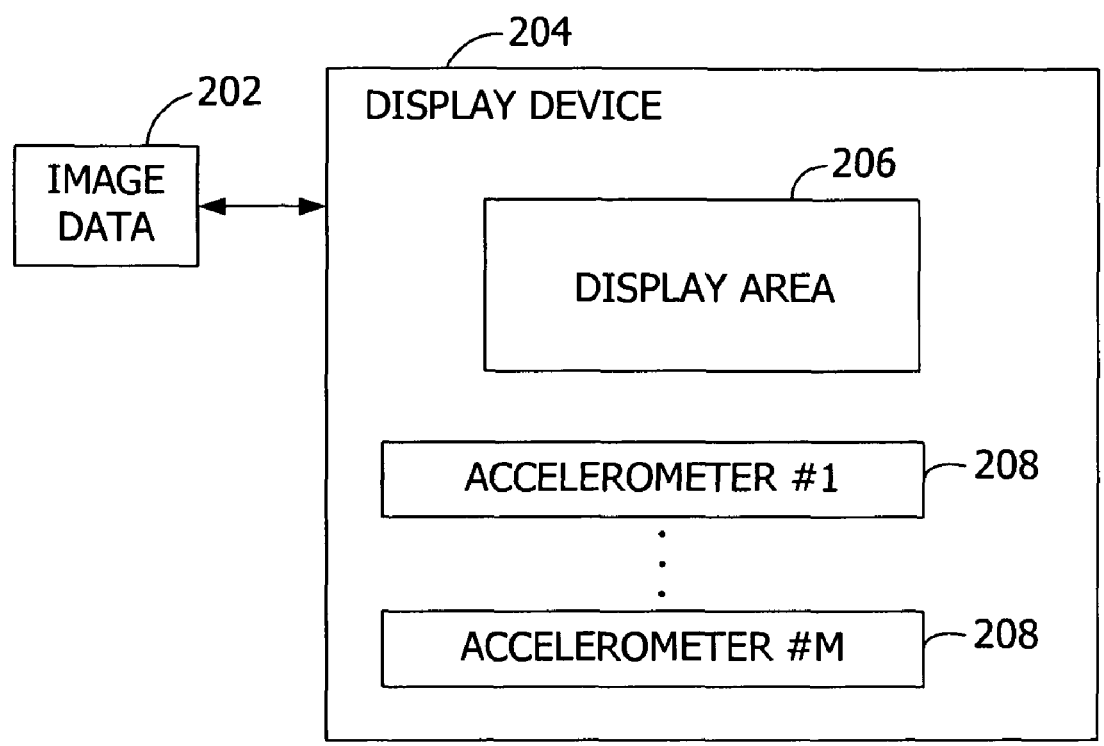
FIG. 2 is an exemplary block diagram illustrating a display device having one or more accelerometers.

Referring next to FIG. 2, an exemplary block diagram illustrates the display device 204 having one or more accelerometers 208. The accelerometers 208 include, for example, accelerometer #1 through accelerometer #M, where M is a positive integer. Accelerometers 208, including digital or analog accelerometers, sense the direction of tilt or a change in position of the display device 204 and provide acceleration data. Various types of accelerometers are known in the art such as a piezo-electric accelerometer, a piezo-resistive accelerometer, a strain gauge accelerometer, and a microelectromechanical accelerometer. Aspects of the invention are operable with these and other types of accelerometers 208. The accelerometers 208 are used to detect small disruptions indicating movement of the display device 204, such as those pathological to the user 101 walking around.

The display device 204 further includes the display area 206 or screen. The display area 206 may constitute any portion of a face of the display device 204. The display area 206 is capable of rendering the image data 202, including video data.

Figure 3A:
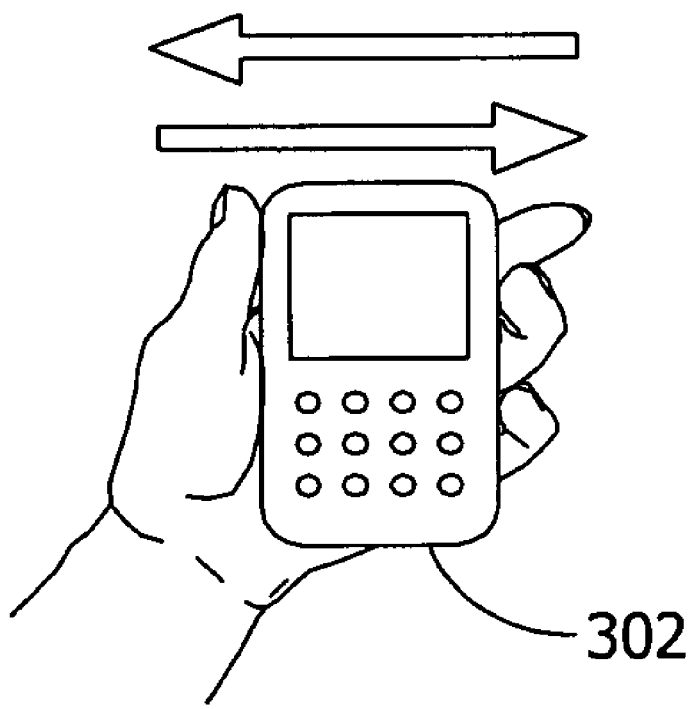
FIG. 3A and FIG. 3B are exemplary block diagrams illustrating movement of a mobile computing device.
Figure 3B:
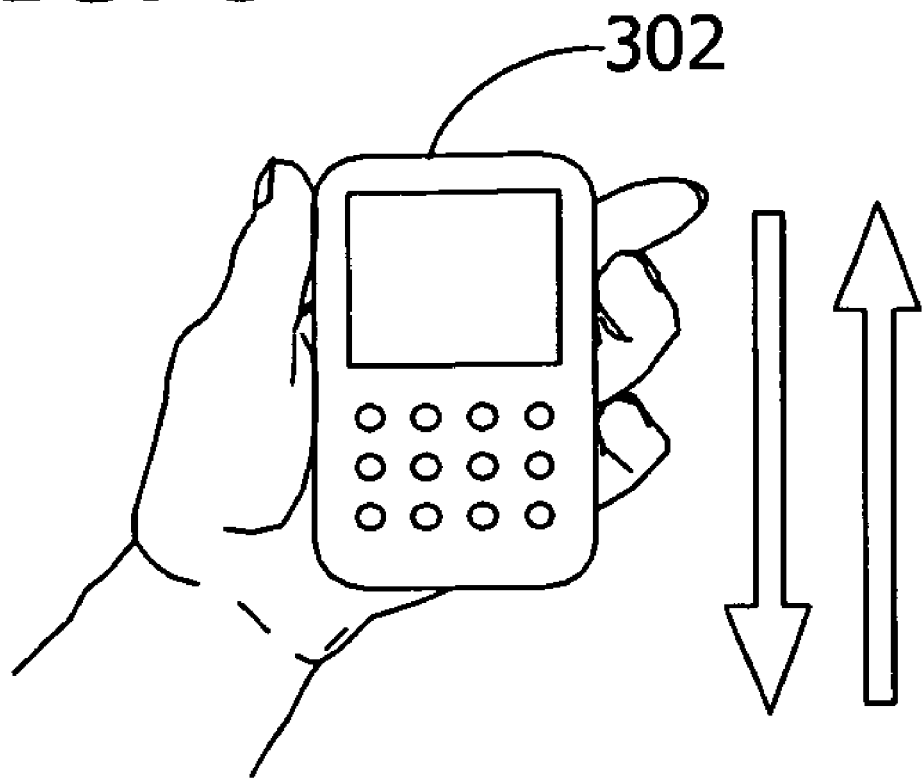

Referring next to FIG. 3A and FIG. 3B, exemplary block diagrams illustrate movement of the mobile computing device 302. FIG. 3A illustrates a side-to-side, horizontal motion of the mobile computing device 302. FIG. 3B illustrates an up-and-down, vertical movement of the mobile computing device 302. In some embodiments (not shown), the mobile computing device 302 also moves towards and away from the user 101. In still other embodiments (not shown), the mobile computing device 302 has a yaw rotation. Embodiments of the invention are operable to compensate for motion in one or more of the three spatial dimensions or directions, including any combination of the directions within any of the dimensions. In some embodiments, there is one accelerometer 208 providing data relating to movement in one of the three spatial dimensions. For example, to obtain three dimension movement data, the mobile computing device 302 includes three accelerometers 208.

Figure 4:
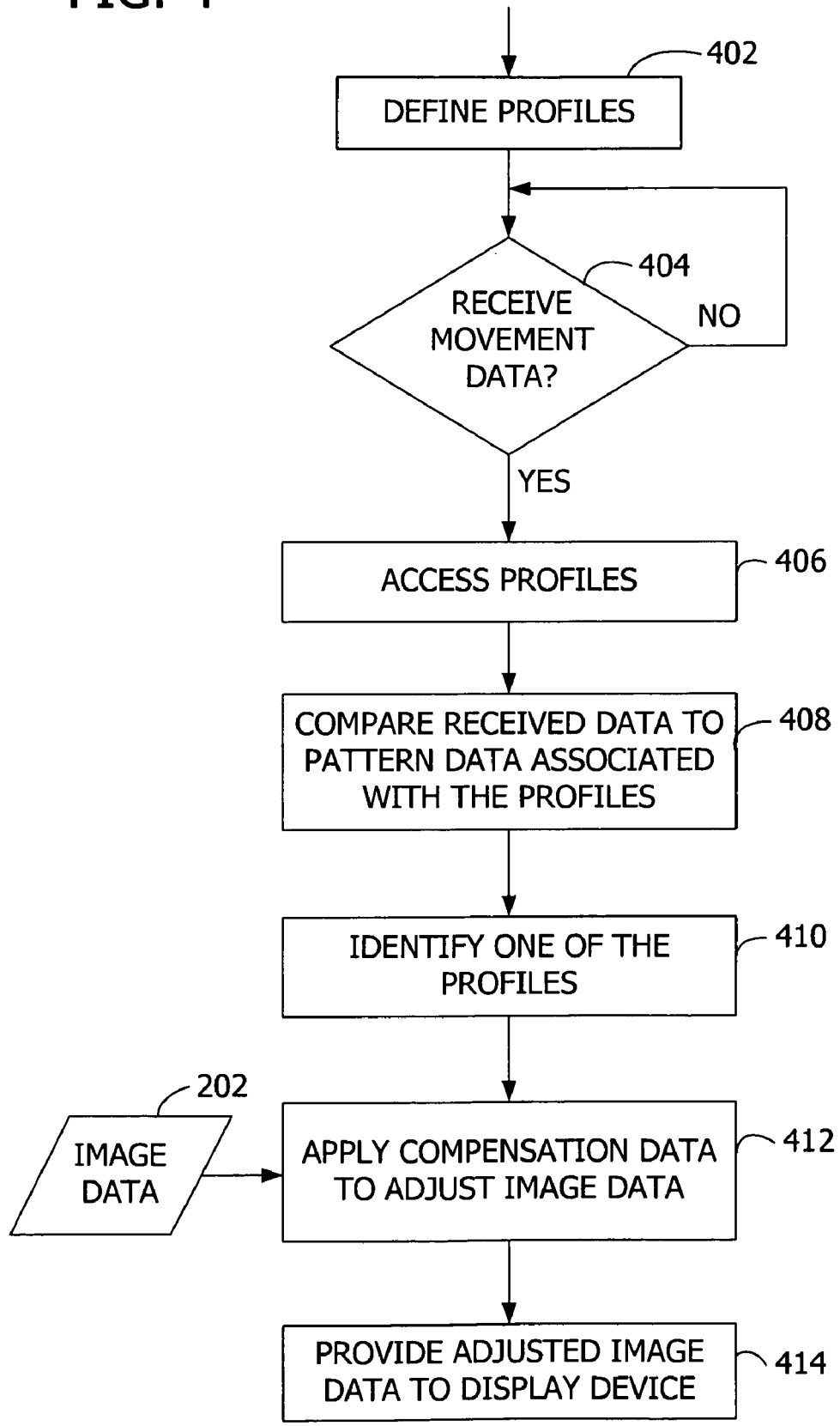
FIG. 4 is an exemplary flow chart illustrating the adjustment of image data based on the anticipated movement of the display device.

Referring next to FIG. 4, an exemplary flow chart illustrates the adjustment or re-positioning of the image data 202 based on the anticipated movement of the display device 204. The operations illustrated in FIG. 4 may be described with reference to the computer-executable components illustrated in FIG. 1. The components maintain a line of sight between the user 101 and the display device 204 during movement of the display device 204. The customization component 114 defines at 402 one or more of the profiles 108. The profiles 108 describe movement of the display device 204 over time for the user 101. In some embodiments, the profiles 108 are user-specific. For example, the customization component 114 prompts the user 101 to provide physical characteristics of the user 101 on which to define the profiles 108. The physical characteristics may be used to alter default profiles 108 stored on the display device 204. Alternatively, the customization component 114 defines the profiles 108 via stop-motion cameras using tracking balls affixed the user 101 or other person. The physical characteristics include, but are not limited to, gait length, gait speed, length of arms, and length of legs.

If movement data is received or detected at 404 by the interface component 116, the stored profiles 108 are accessed at 406. The movement data is received from, for example, one or more of the accelerometers 208 associated with the display device 204. At 408, the received movement data is compared to the pattern data 110 associated with the profiles 108. One of the profiles 108 is identified at 410 based at least on the comparison in 408 (e.g., the user 101 has begun to walk around). For example, the identified profile 108 is the profile 108 whose pattern data 110 most closely matches the movement data being received from the display device 204. In some embodiments, the interface component 116 calculates a time-based average of the received data. The jitter component 116 identifies the profile 108 based on the time-based average. The jitter component 116 may also calculate the anticipated movement based in part on the time-based average, and in part on the pattern data 110 or compensation data 112 associated with the identified profile 108.

As the image data 202 is received at 202, the compensation data 112 associated with the identified profile 108 is applied to the image data 202 to adjust the image data 202 at 412. For example, the jitter component 116 calculates anticipated movements of the display device 204 over time. The anticipated movements are measured in rows or columns of pixels, in some embodiments.

The rectifier component 120 modifies the image data 202 at the corresponding times based on the anticipated movements to compensate or offset the anticipated movements to maintain the image stability relative to the user 101. In an example in which the display device 204 includes a standard display area, the rectifier component 120 modifies the image data 202 such that a portion of the modified image data 202 is displayed outside the standard display area. For example, the anticipated movement is calculated to be in a vertical direction. The image data 202 is then shifted in a vertical direction (e.g., by one or more pixel rows) opposite the anticipated movement, as defined by the compensation data 112. In another example, the anticipated movement is calculated to be in a horizontal direction. The image data 202 is then shifted in a horizontal direction (e.g., by one or more pixel columns) opposite the anticipate movement, as defined by the compensation data 112. Generally, the compensation data 112 is used to determine in which direction the display device 204 is moving and shift the display pixels opposite of that direction to stabilize display of the image.

The display device 204 may include extra rows and columns of pixels around the display area 206 reserved for use with aspects of the invention (e.g., on each side of the display area 206—top, bottom, left, and right—for shifting the image data 202). The movement data (e.g., from the accelerometers 208) is used to re-position the image on the display device 204 making use of the extra rows and columns of pixels as appropriate.

Alternatively or in addition, existing rows and columns within the display area 206 are reserved for use. The quantity of rows and columns reserved varies based on the desired amount of compensation, the degree of the anticipated movements, and the degree of movement to which the display device 204 is prone. In some embodiments, the quantity of rows and columns is dynamically determined as the movement data is continually received by the interface component 116. For example, during vigorous activity, the displayed image may be scaled down or otherwise reduced in size to make available additional rows and columns of pixels to be used to compensate for the anticipated movements.

In some embodiments, the compensation data 112 associated with the identified profile 108 is altered based on the movement data continually received by the interface component 116 (e.g., based on a calculated frequency of movement). For example, if the compensation data 112 dictates an image shift of three columns of pixels yet movement data received recently indicates that the display device 204 is generally moving less than that described by the pattern data 110, the image data 202 may be shifted by less than three columns of pixels to accurately compensate for the anticipated movement. In addition, if the device 204 has noted continuous deviations from the expected pattern data but the usage profile is indicated to remain the same, the device 204 may update the profile with the new expected compensation data either by making permanent modifications to the stored profile data or by issuing temporary modifications that last only for the length of the current usage session.

In an embodiment in which the jitter component 116 calculates an anticipated movement of the display device 204 away from the user 101 at a particular time, the rectifier component 120 modifies the image data 202 by magnifying the image data 202 to maintain a constant zoom factor for the image data 202.

The compensation data 112 may be synchronized with the movement data from the display device 204 (e.g., based on current movement data received by the interface component 116) to enable the appropriate portions of the compensation data 112 to be applied to the anticipated movements of the display device 204. The driver component 122 displays, or provides for display, the modified image data 202.

In an embodiment in which the display device 204 is the mobile computing device 302, data from at least one of the accelerometers 208 is continually received the mobile computing device 302. In embodiments in which power saving concerns are present, the power usage may be reduced by enabling an "auto-pilot" mode in which the accelerometers 208 are powered on for only short intervals, the data is processed, a profile selected, and then the accelerometers 208 are turned off and resources are not used evaluating the incoming data.

The received data is compared to the pattern data 110 of each of the profiles 108, and one of the profiles 108 is identified (e.g., the profile 108 whose pattern data 110 most closely matches the received data). Operations 412 and 414 in FIG. 4 are performed. Even after one of the profiles 108 has been selected, the data is continually received from the accelerometers 208 and compared to the pattern data 110 to identify a change in the profiles 108. For example, the user 101 stops running and starts walking. Alternatively or in addition, the display device 204 receives notification of a change (e.g., via an event) or detects a change in the movement of the display device 204 (e.g., as the user 101 changes the activity causing the movement of the display device 204). For example, the display device 204 becomes connected to a vehicle or becomes disconnected from the vehicle. Another example of the event includes a speed of the display device 204 exceeding a threshold (e.g., the user 101 has entered a car and is driving), or a speed of the display device 204 falling below a threshold. Another profile 108 is then selected based on the received notification or detected change.

Figure 5:
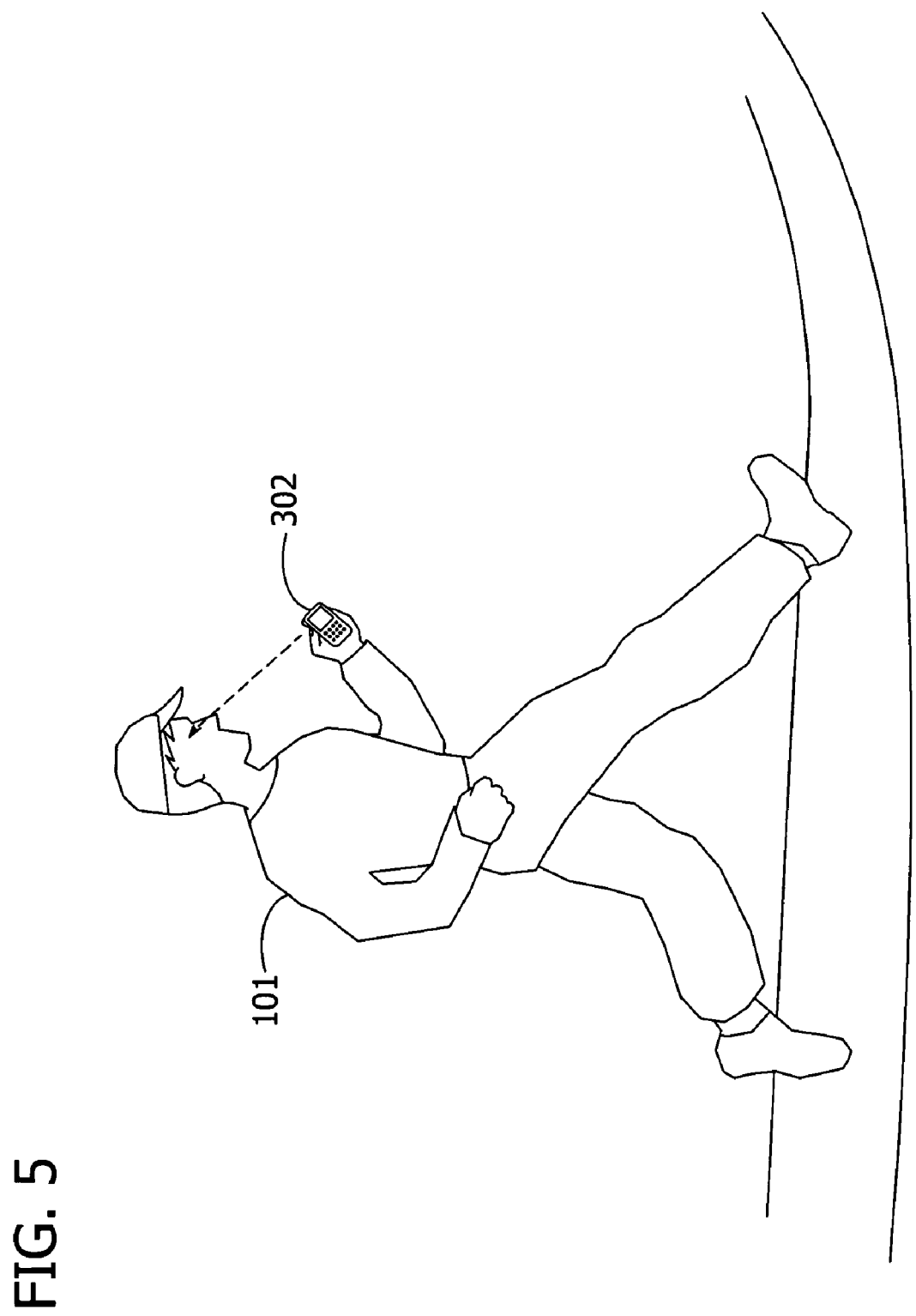
FIG. 5 is an exemplary diagram illustrating a user performing an activity while viewing the mobile computing device.

Referring next to FIG. 5, an exemplary diagram illustrates the user 101 performing an activity while viewing the mobile computing device 302. The activities include, for example, walking, running, jogging, or riding in a motor vehicle. Aspects of the invention operate to maintain a fixed point or line of sight between the user 101 and the mobile computing device 302.

Figure 6:
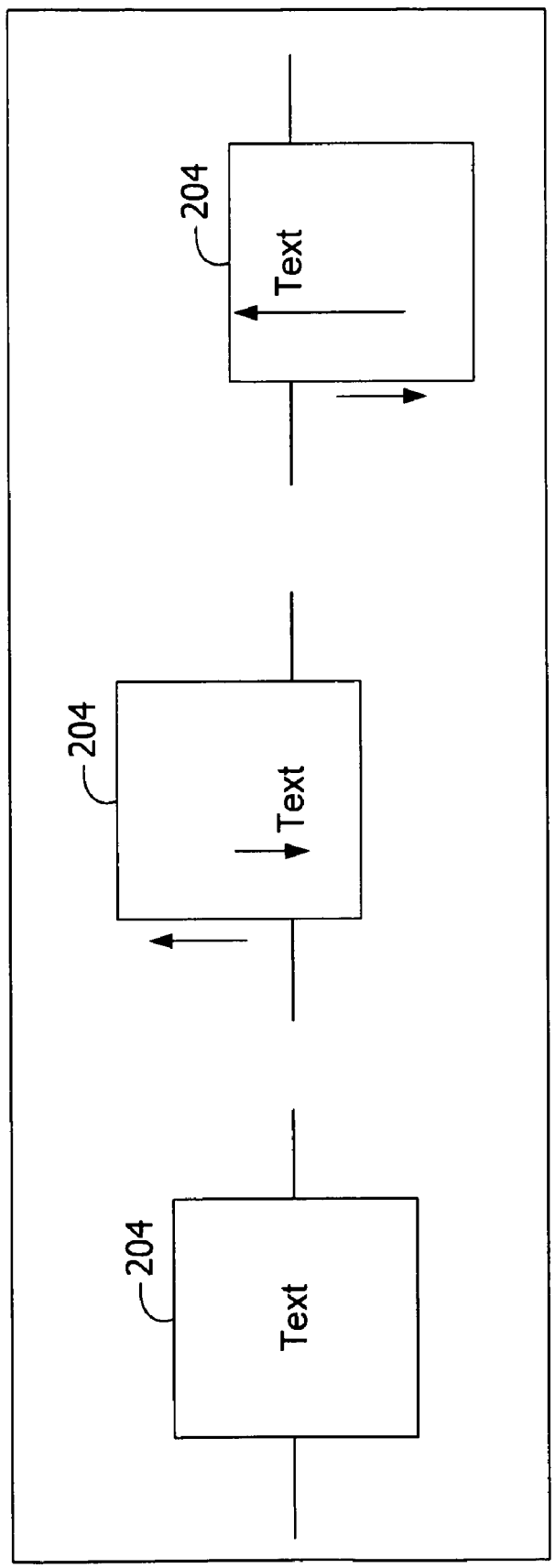
FIG. 6 is an exemplary block diagram illustrating a sequence of movement of the display device and the movement of text displayed on the device.

Referring next to FIG. 6, an exemplary block diagram illustrates a sequence of movement of the display device 204. As the display device 204 moves upward, aspects of the invention anticipate the movement and determine a counteracting quantity of pixels by which to adjust the displayed Text downward. As the display device 204 moves downward, aspects of the invention anticipate the movement and determine a counteracting quantity of pixels by which to adjust the displayed Text upward.

Exemplary Operating Environment

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, personal digital assistants, mobile computing devices, personal computers, server computers, hand-held or laptop devices, portable music players, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The embodiments illustrated and described herein as well as embodiments not specifically described herein but within the scope of aspects of the invention constitute exemplary means for adjusting the image data 202 responsive to anticipated movement of the mobile computing device 302, and exemplary means for adjusting the image data 202 based on the compensation data 112 associated with the identified one of the profiles 108 and based on the continually received data from the accelerometer 208.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for anticipating and compensating for display jitter on a mobile computing device, said system comprising:
   a memory area for storing one or more profiles describing human gait, each of said profiles including pattern data and compensation data, wherein the pattern data includes a sequence of anticipated movements of the mobile computing device including a direction and magnitude of each of the anticipated movements, wherein the compensation data describes a sequence of adjustments to image data as a user of the mobile computing device walks with the mobile computing device; and a processor programmed to:
continually receive data from at least one accelerometer in the mobile computing device;
compare the received data to the pattern data of the profiles;
identify one of the profiles based on the comparison;
receive the image data for display on the mobile computing device;
adjust the received image data based on the compensation data associated with the identified one of the profiles and based on the continually received data from the accelerometer to counteract the sequence of anticipated movements in the pattern data; and
provide the adjusted image data for display on the mobile computing device, wherein the adjusted image data compensates for anticipated jitter of the mobile computing device as the user walks with the mobile computing device.

2. The system of claim 1, wherein the processor is programmed to adjust the received image data by shifting the image data in a vertical direction opposite to the anticipated jitter by one or more pixel rows relative to a display area on the mobile computing device to maintain a line of sight between the user and the mobile computing device.

3. The system of claim 1, wherein the mobile computing device comprises a plurality of accelerometers providing data in three spatial dimensions.

4. The system of claim 1, wherein the processor is further programmed to calculate a frequency of movement of the mobile computing device based on the received data from the accelerometer, and wherein the processor is programmed to dynamically alter the compensation data based on the calculated frequency of movement.

5. The system of claim 1, further comprising means for adjusting the image data responsive to anticipated movement of the mobile computing device, and further comprising means for adjusting the image data based on the compensation data associated with the identified one of the profiles and based on the continually received data from the accelerometer.

6. A method comprising:
accessing a plurality of profiles describing anticipated movements of a display device over time, each of said profiles being associated with a different activity performed by a user, each of said profiles including pattern data and compensation data, wherein the pattern data includes a sequence of the anticipated movements of the display device, wherein the compensation data describes a relationship between image data and a display area of the display device as the display device moves over time;
receiving data from at least one accelerometer associated with the display device;
comparing the received data to the pattern data of the profiles;
identifying one of the profiles based on the comparison;
receiving image data intended for the display device;
applying the compensation data associated with the identified one of the profiles and based on the received data from the accelerometer to adjust the received image data relative to the display area to counteract the sequence of anticipated movements in the pattern data; and
providing the adjusted image data for display on the display device, wherein the adjusted image data dynamically compensates for anticipated movement of the display device over time.

7. The method of claim 6, wherein accessing the profiles comprises accessing the profiles describing movement of the display device comprising one or more of the following: a mobile computing device, a personal digital assistant, a portable music player, a portable gaming console, and a cellular telephone.

8. The method of claim 6, wherein receiving the data from the accelerometer comprises receiving the data from an accelerometer associated with a vehicle in which the display device is contained.

9. The method of claim 6, wherein receiving the data from the accelerometer comprises receiving data from at least three accelerometers, wherein the three accelerometers collectively provide acceleration data in three spatial dimensions.

10. The method of claim 6, wherein accessing the profiles comprises accessing profiles for one or more of the following activities: walking, running, jogging, and riding in a motor vehicle.

11. The method of claim 6, further comprising calculating an anticipated movement of the display device at a subsequent time based on the pattern data, compensation data, and received data from the accelerometer, and wherein applying the compensation data comprises applying the compensation data as a function of the calculated anticipated movement of the display device to adjust the received image data.

12. The method of claim 6, wherein applying the compensation data comprises vertically shifting the received image data by a quantity of rows of pixels relative to the display area in a direction opposite movement of the display device, said quantity of rows of pixels being defined by the compensation data.

13. The method of claim 6, wherein applying the compensation data comprises horizontally shifting the received image data by a quantity of columns of pixels relative to the display area in a direction opposite movement of the display device, said quantity of columns of pixels being defined by the compensation data.

14. The method of claim 6, further comprising:
receiving notification of an event associated with movement of the display device; and
selecting another one of the profiles responsive to the received notification.

15. The method of claim 14, wherein receiving the notification comprises receiving notification of one or more of the following: connection of the display device to a vehicle, disconnection of the display device from a vehicle, a speed of the display device exceeding a threshold, and a speed of the display device falling below a threshold.

16. One or more computer storage media having computer-executable components for maintaining a line of sight between a user and a display device during movement of the display device, said components comprising:
a customization component for defining a plurality of profiles describing movement of the display device over time for the user, each of said defined profiles being associated with a different activity performed by the user;
an interface component for receiving data describing movement of the display device;
a jitter component for identifying, based on the data received by the interface component, one of the profiles defined by the customization component and calculating an anticipated movement of the display device based on the identified profile and the data received by the interface component;

a rectifier component for modifying image data for display based on the anticipated movement calculated by the jitter component to compensate for the anticipated movement; and a driver component for displaying the image data modified by the rectifier component.

17. The computer storage media of claim 16, wherein the jitter component calculates an anticipated movement of the display device away from the user, and wherein the rectifier component modifies the image data by magnifying the image data to maintain a constant zoom factor for the image data.

18. The computer storage media of claim 16, wherein the display device includes a standard display area, and wherein the rectifier component modifies the image data such that a portion of the modified image data is displayed outside the standard display area.

19. The computer storage media of claim 16, wherein the customization component prompts the user to provide physical characteristics of the user, and wherein the customization component defines the profiles based at least on the provided physical characteristics of the user.

20. The computer storage media of claim 16, wherein the interface component further calculates a time-based average of the received data, and wherein the jitter component calculates the anticipated movement based on the calculated time-based average.

\* \* \* \* \*